(12) United States Patent
Steele et al.

(10) Patent No.: US 8,181,676 B2
(45) Date of Patent: May 22, 2012

(54) TEMPORARY MOBILITY KIT WITH INADVERTANT FLOW PREVENTION TECHNIQUES

(75) Inventors: Kimberly Ann Steele, Northville, MI (US); Yingchao Guan, Jiangsu (CN); Darryl L. Jones, Southfield, MI (US); Zhi Qiang He, Nanjing (CN); Sergey Maryanovsky, Southfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 12/963,628

(22) Filed: Dec. 9, 2010

(65) Prior Publication Data

US 2011/0073214 A1 Mar. 31, 2011

Related U.S. Application Data

(63) Continuation of application No. 11/894,390, filed on Aug. 20, 2007.

(51) Int. Cl.
*B65B 31/00* (2006.01)
(52) U.S. Cl. ............ 141/38; 141/114; 141/197; 81/15.6
(58) Field of Classification Search ................ 141/5, 38, 141/67, 100, 104, 105, 114, 193, 197, 231, 141/285, 313, 351; 222/372; 81/15.2, 15.6; 137/223, 227; 152/509
See application file for complete search history.

(56) References Cited

U.S. PATENT DOCUMENTS

| | | | |
|---|---|---|---|
| 6,092,569 A | 7/2000 | Simmel et al. | |
| 6,789,581 B2 | 9/2004 | Cowan et al. | |
| D557,299 S | 12/2007 | Marini et al. | |
| D613,320 S | 4/2010 | Marini | |
| 7,694,698 B2 | 4/2010 | Marini | |
| 7,695,312 B2 | 4/2010 | Steele et al. | |
| 7,789,110 B2 | 9/2010 | Marini | |
| 2008/0277044 A1 | 11/2008 | Marini | |
| 2009/0050232 A1 | 2/2009 | Guan et al. | |
| 2009/0066487 A1 | 3/2009 | Miller et al. | |
| 2009/0193937 A1 | 8/2009 | Steele et al. | |
| 2009/0266440 A1 | 10/2009 | Lolli et al. | |
| 2009/0301602 A1* | 12/2009 | Lolli et al. ................... 141/38 |
| 2010/0005930 A1 | 1/2010 | Lolli et al. | |

FOREIGN PATENT DOCUMENTS

EP CD178983 8/2004
(Continued)

OTHER PUBLICATIONS

Paul Williams, "Product Review: AirMan Tire Repair Sytstem", Canadian Driver, Oct. 15, 2004, 3 pages.
Author Unknown, "Notes on the safe use of the ContiComfort Kit", www.conticomfortkit.co.uk, Jul. 2007.

(Continued)

*Primary Examiner* — Gregory Huson
*Assistant Examiner* — Jason Niesz
(74) *Attorney, Agent, or Firm* — Just Intellectuals, PLLC; Fredrick V. Owens; Kristy J. Downing

(57) ABSTRACT

The present disclosure relates to temporary mobility kits that repair punctured tires. Some embodiments of the kit include an air compressor; a sealant assembly selectively connected to the pump; a sealant hose in the sealant assembly, configured to connect the air compressor to a tire valve; and a first circuit configured to assess a connection condition.

10 Claims, 3 Drawing Sheets

FOREIGN PATENT DOCUMENTS

| | | |
|---|---|---|
| EP | DC535034 | 7/2006 |
| EP | CD656798 | 2/2007 |
| WO | 2006024534 | 3/2006 |
| WO | 2008035163 | 3/2008 |
| WO | 2009027792 | 3/2009 |
| WO | 2009027792 | 9/2009 |
| WO | 2009156817 | 12/2009 |

OTHER PUBLICATIONS

Richards, John, Letter of Jun. 28, 2010 from TEK Global contesting inventorhship, 2 pages.

U.S. Patent No. 7,695,312 titled "Cord Wrap and Power Receptacle Arrangement for Inflator" is now Inter Partes Reexamination No. 95/000,581, filed Dec. 9, 2010.

* cited by examiner

TEMPORARY MOBILITY KIT WITH INADVERTANT FLOW PREVENTION TECHNIQUES

CROSS-REFERENCE TO RELATED APPLICATIONS

This application is a continuing application and claims the benefit of U.S. Non-Provisional patent application Ser. No. 11/894,390 titled "Switch and Hose-Valve Connection Arrangement for Vehicle Temporary Mobility Kit" filed Aug. 20, 2007, which is hereby incorporated by reference in its entirety.

TECHNICAL FIELD

The present disclosure relates to tire repair kits and control circuits for the same.

BACKGROUND

Automotive manufacturers have traditionally offered spare tires with the vehicles they produce. Today, most vehicle spare tires are mounted in the rear section of the vehicle, e.g., inside the vehicle's trunk. While this arrangement provided a suitable solution for placement of the spare tire for decades, changes in fuel economy requirements dictated the need for vehicle weight reduction. A spare tire can weight anywhere from 30-100 pounds on average. Moreover, for larger vehicles like SUVs and trucks a full-size spare is used.

A "temporary mobility kit" (or "TMK") can be substituted for the spare tire. The TMK includes a dual-purpose air compressor and a sealing system. The sealing system includes a sealing compound that will effectively seal most punctures caused by nails or similar objects. The air compressor drives the sealing compound into the compromised tire and subsequently can be used to re-inflate the tire.

Current TMKs have their limitations. For example, sealant can be prematurely dispersed if the sealant hose is not completely connected to the tire valve. Also, if a user presses the on-switch without connecting the sealant hose to the tire valve latex will be sprayed out and there is a risk of running out of sealant. Additionally, it is possible that sealant will be mis-sprayed when the diverter switch (between air and sealant) is over turned.

Therefore, it is desirable to have a TMK with inadvertent flow prevention features. A sensor to detect the connection condition of the sealant assembly is needed. Also a power reset function can be added to make sure that latex is sprayed only when start button is pressed after power plug is connected to power supply and/or after the diverter valve is turned in the appropriate position with the power on.

SUMMARY

The present invention addresses at least one or more of the above-mentioned issues. Other features and/or advantages may become apparent from the description which follows.

Certain embodiments of the present invention relate to a temporary mobility kit for repairing tires, including: an air compressor; a sealant assembly selectively connected to the pump; a sealant hose in the sealant assembly, configured to connect the air compressor to a tire valve; and a first circuit configured to asses a connection condition.

Another exemplary embodiment of the present invention relates to a circuit for preventing inadvertent flow of a fluid from a tire repair kit, the circuit including: a first metal contact, in the sealant hose, linked to the circuit through a first metal lead; a second metal contact, in the sealant hose, linked to the circuit through a second metal lead; and a switch defined by the first and second metal contact. The first and second metal contact are configured to close the switch when the sealant hose is attached to a tire valve Another exemplary embodiment of the present invention relates to a circuit for preventing inadvertent flow of a fluid from a tire repair kit, the circuit including: a first metal contact in a sealant assembly; a second metal contact in a kit housing; and a first switch defined by the first and second metal contact. The first and second metal contacts are configured to close the first switch when the sealant assembly is attached to the kit housing.

Another exemplary embodiment of the present invention relates to a control circuit for preventing inadvertent flow of a fluid from a tire repair kit, including: a switch and logic circuit having a diverter valve switch configured to designate a kit fluid source for kit utilization; and a reset circuit configured to connect an air compressor to a power source when a control signal is received from the switch and logic circuit after power is received by the reset circuit.

Yet another exemplary embodiment of the present invention relates to a method of manufacturing a tire repair kit configured to detect a connection condition, the method including: providing a sealant assembly; attaching a sealant hose to the sealant assembly; including a switch in one end of the sealant hose configured to close when the sealant hose is attached to a tire valve.

One advantage of the present disclosure is that it provides various inadvertent flow prevention techniques that eliminate inadvertent sealant flow from the kit. Improved material utilization results from the control logic disclosed herein.

In the following description, certain aspects and embodiments will become evident. It should be understood that the invention, in its broadest sense, could be practiced without having one or more features of these aspects and embodiments. It should be understood that these aspects and embodiments are merely exemplary and explanatory and are not restrictive of the invention.

The invention will be explained in greater detail below by way of example with reference to the figures, in which the same references numbers are used in the figures for identical or essentially identical elements. The above features and advantages and other features and advantages of the present invention are readily apparent from the following detailed description of the best modes for carrying out the invention when taken in connection with the accompanying drawings. In the figures:

Figure 1:
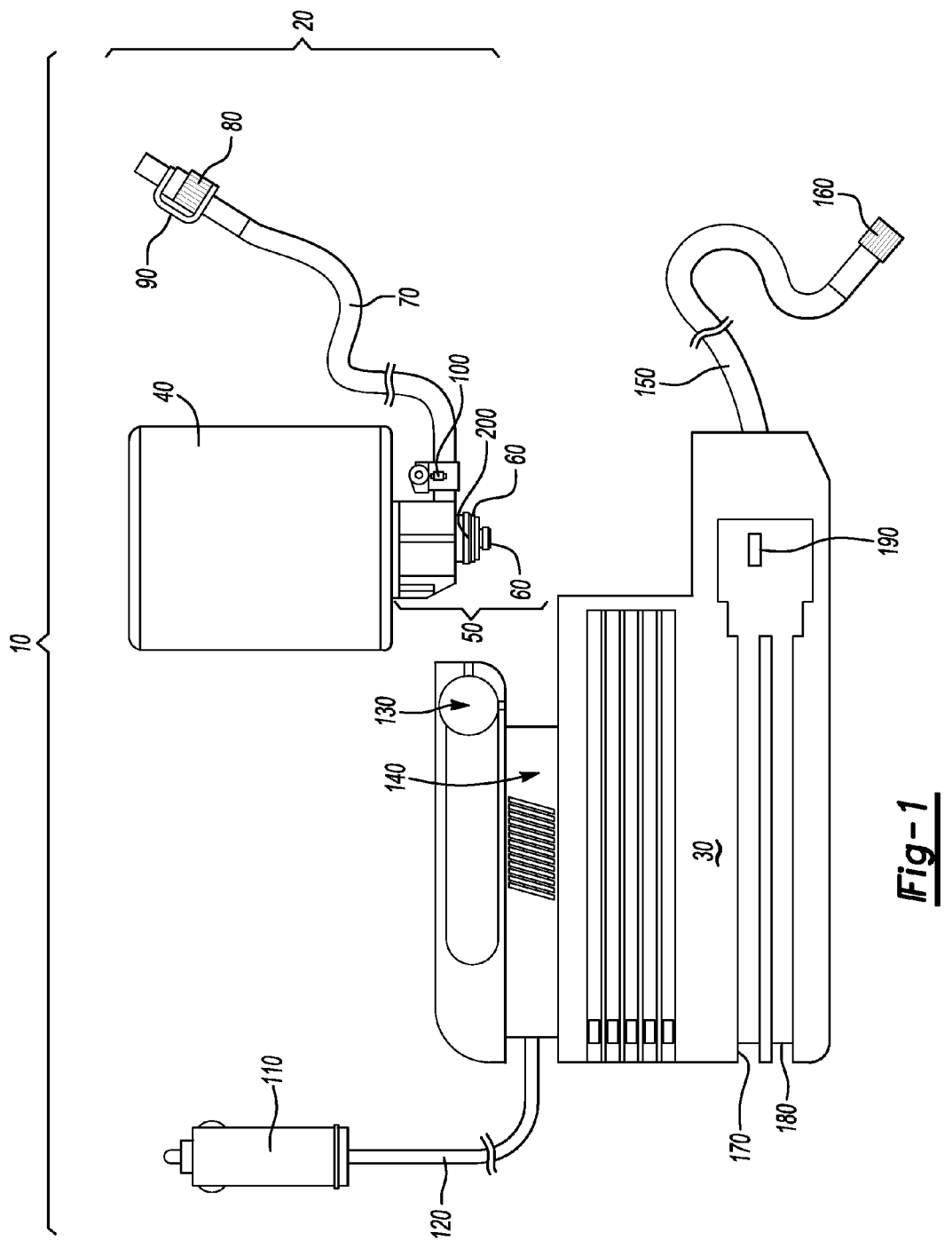
FIG. 1 is a side view of a temporary mobility kit with detachable sealant assembly.

Although the following detailed description makes reference to illustrative embodiments, many alternatives, modifications, and variations thereof will be apparent to those skilled in the art. Accordingly, it is intended that the claimed subject matter be viewed broadly.

DETAILED DESCRIPTION

Referring to the drawings wherein like characters represent the same or corresponding parts throughout the several views there are shown various exemplary temporary mobility kits used to repair and inflate punctured tires. The kits are intended to provide a light-weight alternative to transporting the vehicle's spare tire. Kits are configured to selectively disperse a sealant material into the tire (e.g., a latex or polymer). Once the sealant is distributed in the tire, the puncture is closed. The same kit can then be utilized to inflate the tire by feeding ambient air into the tire through an air compressor. Specific embodiments disclosed are configured to prevent inadvertent flow of sealant. In one embodiment, electro-mechanical means are incorporated into the kit to ensure that the sealant assembly is properly connected to the tire valve and kit housing before the air compressor is turned on. For example, in one embodiment as sensor to detect sealant hose connection is included in the control circuit for the kit. In this manner, inadvertent flow of sealant material is eliminated. Kits are compatible with tires of various sizes including 10"-24" tires, motorcycle tires, bicycle tires and other inflatable articles.

Figure 5:
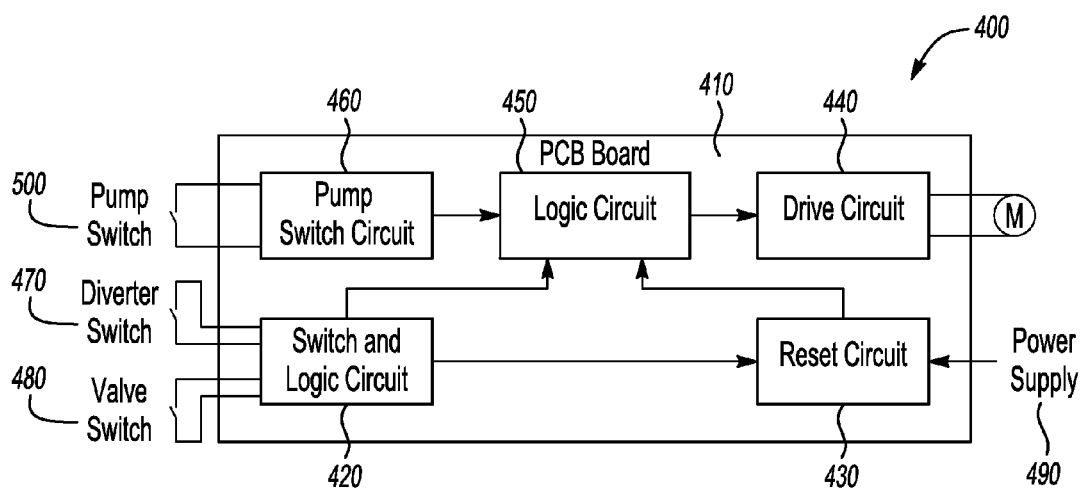
FIG. 5 is a schematic depiction of a control circuit for a temporary mobility kit.

Referring now to FIG. 1, there is shown therein an exemplary temporary mobility kit 10 that can be used for repairing vehicle tires. The kit 10 includes a motor or air compressor (as shown in FIG. 5) that forces air and/or sealant into a tire. The kit 10, shown in FIG. 1, has a sealant assembly 20 attached from the kit housing 30. Sealant assembly 10 includes a sealant canister 40 that holds the sealant solution. The canister 40 is cylindrical and sealed, with the exception of a valve (not shown) incorporated into the base of the assembly 50. When the assembly is attached to the kit housing 30 the valve is configured to be in fluid communication with the air compressor so as to selectively guide sealant from the canister 40. The base 50 also includes a set of sealing rings (or O-rings) 60 to prevent sealant from leaking when air is forced through the sealant base. Sealant is guided through a hose 70 that attaches to a tire valve. Hose 70 includes a threaded metallic end 80 configured to mate with a tire valve stem. When the sealant hose 70 is not in use an end cap 90 is provided at one end of the hose to seal the end. The base 50 of the sealant assembly further includes a metal contact 100. The metal contact 100 is a portion of the switch (or sensor) used to detect sealant assembly attachment to the kit housing (as is discussed hereinbelow with respect to FIGS. 2 and 3).

As shown in FIG. 1, the kit 10 includes a housing 30 with the air compressor (or motor) therein. A control circuit, as shown in FIG. 5, is also incorporated in the kit housing 30. Kit 10 is configured receive electrical power through a plug 110. In this embodiment, plug 110 is a 12-volt plug compatible with the in-vehicle electrical outlet which commonly holds the "cigarette lighter." The plug 110 is attached to the kit 10 via a power cord 120. This kit includes cord storage features formed in the kit housing that enable the plug and cord to be stowed in sections 130 and 140 of the kit housing, respectively.

Kit 10, of FIG. 1, also includes a separate hose 150 for distributing air to the tire for inflation. Hose 150 is connected to the air compressor through the valve in the sealant base 50. Hose 150 includes a threaded end 160 to connect to the air compressor to the tire valve. The kit housing 30 includes two channels 170, 180 formed in the bottom portion of the housing to secure hoses therein. A release button 190 is also included in the kit housing 30. The button 190 is linked to a spring-loaded retaining member (not shown) that secures a collar 200 on base 50 to the kit housing 30.

Figure 2:
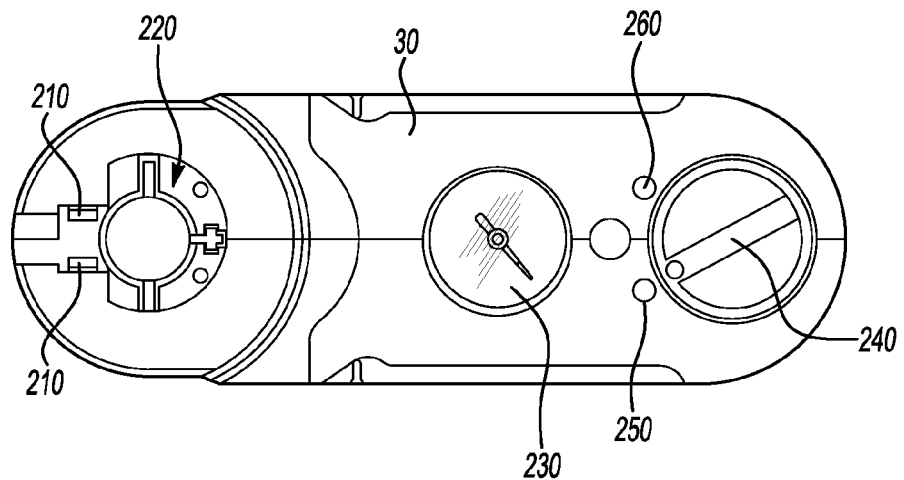
FIG. 2 is a top view of the kit housing from FIG. 1, which sealant assembly detached.
Figure 3:
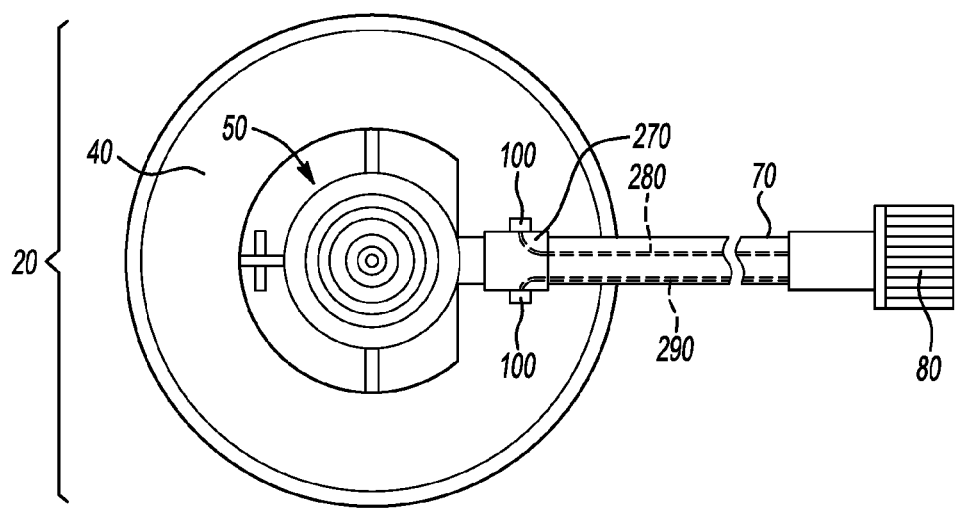
FIG. 3 is a bottom view of the sealant assembly from FIG. 1.

Referring now to FIGS. 2 and 3, there is shown therein two sensors or switches for detecting a connection condition of the sealant assembly. First, there is shown matable electrical contacts 100 and 210 on the sealant assembly base 50 and kit housing 30, respectively. FIG. 2 is a top-down view of the kit housing 30 with the sealant assembly 20 detached from the housing. The housing 30 includes a receptacle 220 in which the collar 200 on the base 50 of the sealant assembly 20 is compatible. The forward end of the housing 30 includes two metal contacts 210 that are configured to mate with metal contacts 100 formed on the sealant base 50 (as shown in FIG. 3). The matable metal contacts 100 and 210 form a switch (or sensor) for detecting sealant assembly 20 attachment to the kit housing 30. When the sealant assembly 20 is fully inserted in receptacle 220, the switch is closed.

The kit housing 30, as shown in FIG. 2, includes additional control features that are external to the kit housing. As shown a pressure gauge 230 is provided on the kit housing 30. Readings on the tire pressure level are displayed on the gauge 230. A diverter switch (or knob) 240 is also provided on the kit exterior. The diverter switch 240 controls the valve in the base 50 of the sealant assembly 20. When the switch 240 is turned in position 250, the valve is configured to enable ambient air alone to flow from the system compressor. When the switch 240 is turned in position 260, the valve is positioned so that sealant can flow from the sealant canister 40 into the tire. The knob 240 can be any sort of electrical or mechanical interface to signal position changes to the valve.

FIG. 3 illustrates the second half of the sealant assembly connection detection sensor. Illustrated in FIG. 3 is a bottom-up view of the sealant assembly 20 detached from the kit housing 30. The canister 40 is mounted to the base 50. A connector 270 is included between the base 50 and the sealant hose 70. Metal contacts 100 are threaded through connector 270. The hose 70 extends from the base 50 to end 80. When the sealant assembly 20 is fully inserted in receptacle 220, the switch is closed. An exemplary valve switch is shown as 480 in FIG. 5.

FIG. 3 further illustrates the next set of sensors or switches for detecting a connection condition of the sealant assembly 20. Electrical leads 280 and 290 are run from metal contacts 100 to the metallic end of the sealant hose 80. Lead 280 is routed to the outer diameter of the end 80. Lead 290 is routed to an inner member 300 (as discussed with respect to FIG. 4). Switch is closed when the outer and inner portions of the end connector 80 are mated with a tire valve.

Figure 4:
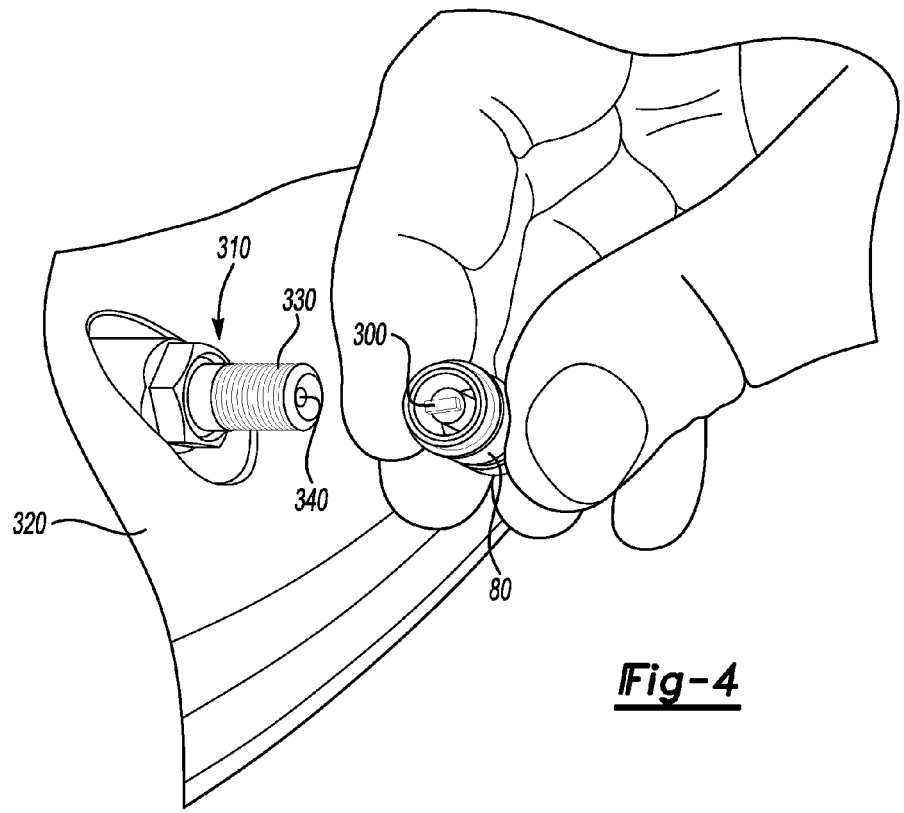
FIG. 4 is a perspective view of the sealant hose end from the kit of FIG. 1 and a tire valve.

An exemplary tire valve 310 compatible with the sealant hose end 80 is shown in FIG. 4. FIG. 4 is a partial perspective view of a vehicle tire 320 with tire valve 310. The tire valve 310 includes a threaded stem 330 and an inner core 340 that extends parallel to the stem. Depression of the inner core 340 enables fluid (or air) to enter the tire 320. Sealant hose end 80 includes an inner member or flange 300 that is a metal contact matable with core 340. Lead 290 (shown in FIG. 3) is run to the inner flange or core 300 on the sealant hose end. Lead 280 is run to the outer portion of the hose end 80 as shown in FIG. 4. When the sealant hose 70 is sufficiently connected so that the inner core and stem of the tire valve 310 and inner core and outer portion of the sealant end 80 come into contact the switch is closed. In one embodiment, this switch is required to close before power is provided to the air compressor. Sealant can only be released when the connection condition of the sealant hose 70 is positive. In this way, sealant is not distributed into the atmosphere inadvertently.

FIG. 5 illustrates several different circuits included in an exemplary control circuit 400 for a temporary mobility kit. Control circuit 400 includes a printed circuit board 410 with subsidiary circuits 420, 430, 440, 450 and 460 that control kit functionality. Logic circuit 450 is a processor configured to receive control signals from circuits 420, 430, 440, and 460. Control signals can be analog or digital. Switch and logic circuit 420 is linked to a diverter switch 470 and valve switch 480. The diverter switch 470 is similar to diverter switch discussed with respect to FIG. 2. The switch 470 controls valve position between facilitating flow from the sealant canister, ambient air or closed. Diverter valve switch 470 is thereby configured to designate a kit fluid source—ambient air or sealant—for kit utilization. Valve switch 480 is defined by matable metal contacts—e.g., the hose end 80 and inner flange 300 with the tire valve stem 330 and inner core 340, respectively (as shown and discussed with respect to FIG. 4). In another embodiment, valve switch 480 is defined by matable metal contacts on the sealant assembly and kit housing—e.g., contacts 210 and contacts 100 (as shown and discussed with respect to FIGS. 2-3). Valve switch 480 sends a control signal to logic circuit 450 when valve connection is detected.

In this embodiment, control circuit 400, as shown in FIG. 5, includes software to only enable power to be supplied to the drive circuit 440 if a predetermined condition is met—the diverter switch 470 having changed position after the kit is plugged into the power source 490. Logic circuit 450 is configured to receive control signals from the switch and logic circuit 420, through the reset circuit 430. Reset circuit is design to connect the air compressor motor, "M," to the power source 490 when a control signal is received from the switch and logic circuit 420 only after power is received. A control signal for a change in diverter valve 470 position is only sent through to the logic circuit 450 from the reset circuit 430 if power is provided to the reset circuit 430 before a command signal is received from the switch and logic circuit 420.

In one scenario the switch and logic circuit 420 is on and the diverter switch 470 is in the sealant flow position 260 (as shown in FIG. 2). In this embodiment, the predetermined conditions for sealant flow is power being supplied to the kit through reset circuit 430 before control signals from the switch and logic circuit 420 or pump switch circuit 460 is processed and the drive circuit is accordingly activated. The sealant assembly is attached to the kit housing and the sealant hose is completely connected to the tire valve stem—i.e., valve switch 480 is closed. Reset circuit 430 is turned on when the kit is plugged into the power source 490 before operation of pump switch 500. Once power is received, the pump switch circuit 460 is activated; thereafter the circuit 460 sends a signal when pump switch 500 is closed (or the kit is switched on). Logic circuit 450 has a default position disconnecting the drive circuit 440 from the power supply 490 until the predetermined condition(s) are satisfied, thereby eliminating inadvertent sealant flow.

A valve switch 480 is also linked to the switch and logic circuit 420. Valve switch includes sensors configured to detect the connection condition of the sealant assembly. Valve switch 480 is opened unless sealant assembly is completely attached to kit housing and sealant hose end is completely attached to a tire valve. Switch and logic circuit 420 provides a control signal to the logic circuit 450 and/or reset circuit 430 indicative of the sealant canister connection condition. If the sealant assembly is disconnected from the kit or the tire stem, power is not provided from the reset circuit 430 to logic circuit 450.

Logic circuit 450 interconnects the drive circuit 440 to the main power supply through reset circuit 430, as shown in FIG. 5. An air compressor is shown as a motor, "M," in FIG. 5. Drive circuit 440 supplies power to the motor when logic circuit 450 and reset circuit 430 allows power to pass therethrough. One predetermined condition for the provision of power to drive circuit 440 is that the "on" command signal be received only after power is supplied to the reset circuit 430. The air compressor is not turned on simply by plugging the kit into a power source.

A pump switch 460 is also provided in the control circuit 400 shown in FIG. 5. Pump switch 460 is the on/off bottom for the kit. Pump switch 460 provides a control signal to turn the kit on and off on-demand. In one embodiment, as discussed above, the logic circuit 450 includes software to only turn the kit on if a control signal is sent from pump switch 500 after power is received by reset circuit 430.

As shown in the exemplary embodiments, a method of manufacturing a TMK is disclosed. The TMK is configured to detect a connection condition of the kit. The method can include the steps of: providing a sealant assembly (e.g., 20 as shown in FIG. 1); attaching a sealant hose 70 to the sealant assembly; and including a switch in one end of the sealant hose configured to close when the sealant hose is attached to a tire valve. An exemplary switch 480 is shown and discussed in FIGS. 2-3.

It will be apparent to those skilled in the art that various modifications and variations can be made to the methodologies of the present invention without departing from the scope its teachings. Other embodiments of the invention will be apparent to those skilled in the art from consideration of the specification and practice of the teachings disclosed herein. It is intended that the specification and examples be considered as exemplary only.

While the best modes for carrying out the invention have been described in detail, those familiar with the art to which this invention relates will recognize various alternative designs and embodiments for practicing the invention within the scope of the appended claims.

We claim:

1. A temporary mobility kit for repairing tires, comprising:
an air compressor;
a sealant assembly selectively connected to the air compressor;
a sealant hose in the sealant assembly, configured to connect the air compressor to a tire valve; and
a first circuit configured to assess a connection condition;
wherein the first circuit is configured to selectively link a power source to the air compressor;
wherein the first circuit includes:
    a first metal contact, in the sealant hose, linked to the first circuit through a first metal lead;
    a second metal contact, in the sealant hose, linked to the first circuit through a second metal lead; and
    a first switch defined by the first and second metal contact; wherein the first and second metal contact are configured to close the first switch thus linking the power source to the air compressor when the sealant hose is attached to a tire valve;
wherein the first metal contact is configured to mate with a tire valve stem.

2. The kit of claim 1, wherein the connection condition is sealant assembly attachment to a kit housing.

3. The kit of claim 1, wherein the connection condition is sealant hose attachment to a tire valve.

4. The kit of claim 1, wherein the second metal contact is configured to mate with a tire valve core.

5. The kit of claim 1, wherein the first circuit includes:
   a second switch having a third metal contact in the sealant assembly and a fourth metal contact in a kit housing;
   wherein the second switch is configured to close when the sealant assembly is attached to the kit housing.

6. A control circuit for preventing inadvertent flow of a fluid from a tire repair kit, the circuit including:
   a first metal contact, in a sealant hose, linked to the circuit through a first metal lead;
   a second metal contact, in the sealant hose, linked to the circuit through a second metal lead; and
   a switch defined by the first and second metal contacts;
   wherein the first and second metal contacts are configured to close the switch when the sealant hose is attached to a tire valve;
   wherein the first metal contact is configured to mate with a tire valve stem.

7. The circuit of claim 6, wherein the second metal contact is configured to mate with a tire valve core.

8. The circuit of claim 6, wherein the circuit further comprises:
   a second switch having a third metal contact in the sealant assembly and a fourth metal contact in a kit housing;
   wherein the second switch is configured to close when the sealant assembly is attached to the kit housing.

9. A control circuit for preventing inadvertent flow of a fluid from a tire repair kit, the circuit including:
   a first metal contact in a sealant assembly;
   a second metal contact in a kit housing; and
   a first switch defined by the first and second metal contacts;
   wherein the first and second metal contacts are configured to close the first switch when the sealant assembly is attached to the kit housing;
   a second switch having a default position disconnecting the air compressor from a power source;
   wherein the second switch is configured to close, connecting the air compressor to the power source under predetermined conditions;
   wherein the predetermined condition is either: (i) receiving an on-signal after power is received from the power source; or (ii) receiving a control signal from a diverter switch after power is received from the power source.

10. A temporary mobility kit for repairing tires, comprising:
    an air compressor;
    a sealant assembly selectively connected to the air compressor;
    a sealant hose in the sealant assembly, configured to connect the air compressor to a tire valve;
    a first circuit configured to assess a connection condition; and
    a second circuit, the second circuit including:
       a switch having a default position disconnecting the air compressor from a power source;
       wherein the switch is configured to close, connecting the air compressor to the power source, under a predetermined condition;
       wherein the predetermined condition is either: (i) receiving an on-signal after power is received from the power source; or (ii) receiving a control signal from a diverter switch after power is received from the power source.

* * * * *

INTER PARTES REEXAMINATION CERTIFICATE (754th)

United States Patent
Steele et al.

(10) Number: US 8,181,676 C1
(45) Certificate Issued: Dec. 5, 2013

(54) TEMPORARY MOBILITY KIT WITH INADVERTENT FLOW PREVENTION TECHNIQUES

(75) Inventors: Kimberly Ann Steele, Northville, MI (US); Yingchao Guan, Jiangsu (CN); Darryl L. Jones, Southfield, MI (US); Zhi Qiang He, Nanjing (CN); Sergey Maryanovsky, Southfield, MI (US)

(73) Assignee: Ford Global Technologies, Dearborn, MI (US)

Reexamination Request:
No. 95/000,692, Sep. 14, 2012

Reexamination Certificate for:
Patent No.: 8,181,676
Issued: May 22, 2012
Appl. No.: 12/963,628
Filed: Dec. 9, 2010

Related U.S. Application Data

(63) Continuation of application No. 11/894,390, filed on Aug. 20, 2007, now Pat. No. 8,146,622.

(51) Int. Cl.
*B65B 31/00* (2006.01)

(52) U.S. Cl.
USPC .............. 141/38; 141/114; 141/197; 81/15.6

(58) Field of Classification Search
None
See application file for complete search history.

(56) References Cited

To view the complete listing of prior art documents cited during the proceeding for Reexamination Control Number 95/000,692, please refer to the USPTO's public Patent Application Information Retrieval (PAIR) system under the Display References tab.

*Primary Examiner* — Peter C. English

(57) ABSTRACT

The present disclosure relates to temporary mobility kits that repair punctured tires. Some embodiments of the kit include an air compressor; a sealant assembly selectively connected to the pump; a sealant hose in the sealant assembly, configured to connect the air compressor to a tire valve; and a first circuit configured to assess a connection condition.

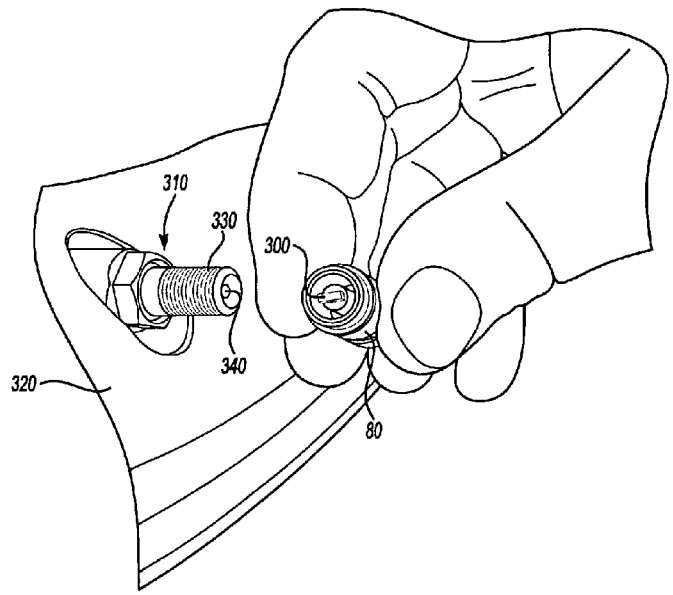

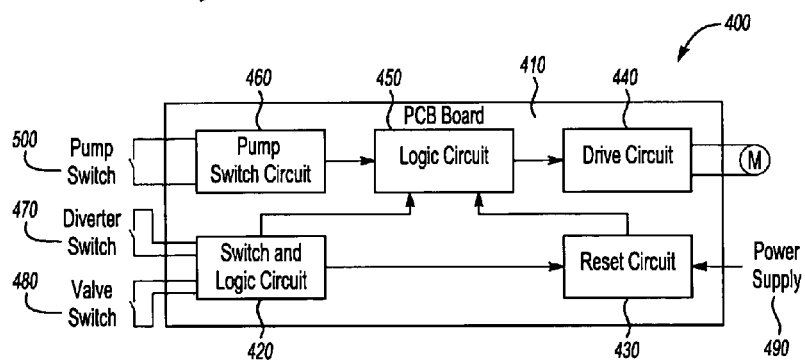

US 8,181,676 C1

INTER PARTES REEXAMINATION CERTIFICATE ISSUED UNDER 35 U.S.C. 316

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINT HEREIN.

Column 1, lines 59-64:

Certain embodiments of the present invention relate to a temporary mobility kit for repairing tires, including: an air compressor; a sealant assembly selectively connected to the pump; a sealant hose in the sealant assembly, configured to connect the air compressor to a tire valve; and a first circuit configured to [asses] *assess* a connection condition. *The first circuit is configured to selectively link a power source to the air compressor. The first circuit includes: a first metal contact, in the sealant hose, linked to the first circuit through a first metal lead; a second metal contact, in the sealant hose, linked to the first circuit through a second metal lead; and a first switch defined by the first and second metal contacts. The first and second metal contacts are configured to close the first switch, thus linking the power source to the air compressor, when the sealant hose is attached to a tire valve. The first metal contact is configured to mate with a threaded tire valve stem.*

Column 1, line 65-Column 2, line 6:

Another exemplary embodiment of the present invention relates to a *control* circuit for preventing inadvertent flow of a fluid from a tire repair kit, the circuit including: a first metal contact, in the sealant hose, linked to the circuit through a first metal lead; a second metal contact, in the sealant hose, linked to the circuit through a second metal lead; and a switch defined by the first and second metal [contact] *contacts*. The first and second metal [contact] *contacts* are configured to close the switch when the sealant hose is attached to a tire valve. *The first metal contact is configured to mate with a threaded tire valve stem.*

Column 2, lines 7-15:

Another exemplary embodiment of the present invention relates to a circuit for preventing inadvertent flow of a fluid from a tire repair kit, the circuit including: a first metal contact in a sealant assembly; a second metal contact in a kit housing; and a first switch defined by the first and second metal [contact] *contacts*. The first and second metal contacts are configured to close the first switch when the sealant assembly is attached to the kit housing. *Also included is a second switch having a default position disconnecting the air compressor from a power source. The second switch is configured to close, connecting the air compressor to the power source under predetermined conditions. The predetermined condition is either: (i) receiving an on-signal after power is received from the power source; or (ii) receiving a control signal from a diverter switch after power is received from the power source.*

Column 3, lines 26-48:

Referring now to FIG. 1, there is shown therein an exemplary temporary mobility kit 10 that can be used for repairing vehicle tires. The kit 10 includes a motor or air compressor (as shown in FIG. 5) that forces air and/or sealant into a tire. The kit 10, shown in FIG. 1, has a sealant assembly 20 attached from the kit housing 30. Sealant assembly [10] *20* includes a sealant canister 40 that holds the sealant solution. The canister 40 is cylindrical and sealed, with the exception of a valve (not shown) incorporated into the base of the assembly 50. When the assembly is attached to the kit housing 30 the valve is configured to be in fluid communication with the air compressor so as to selectively guide sealant from the canister 40. The base 50 also includes a set of sealing rings (or O-rings) 60 to prevent sealant from leaking when air is forced through the sealant base. Sealant is guided through a hose 70 that attaches to a tire valve. Hose 70 includes a threaded metallic end 80 configured to mate with a tire valve stem. When the sealant hose 70 is not in use an end cap 90 is provided at one end of the hose to seal the end. The base 50 of the sealant assembly further includes a metal contact 100. The metal contact 100 is a portion of the switch (or sensor) used to detect sealant assembly attachment to the kit housing (as is discussed hereinbelow with respect to FIGS. 2 and 3).

AS A RESULT OF REEXAMINATION, IT HAS BEEN DETERMINED THAT:

Claims 1, 6, 9 and 10 are determined to be patentable as amended.

Claims 2, 3, 5 and 8, dependent on an amended claim, are determined to be patentable.

New claims 11-15 are added and determined to be patentable.

Claims 4 and 7 were not reexamined.

1. A temporary mobility kit for repairing tires, comprising:
an air compressor;
a sealant assembly selectively connected to the air compressor;
a sealant hose in the sealant assembly, configured to connect the air compressor to a tire valve; and
a first circuit configured to assess a connection condition;
wherein the first circuit is configured to selectively link a power source to the air compressor;
wherein the first circuit includes:
a first metal contact, in the sealant hose, linked to the first circuit through a first metal lead;
a second metal contact, in the sealant hose, linked to the first circuit through a second metal lead; and
a first switch defined by the first and second metal [contact] *contacts*; wherein the first and second metal [contact] *contacts* are configured to close the first switch, thus linking the power source to the air compressor, when the sealant hose is attached to a tire valve;
wherein the first metal contact is configured to mate with a *threaded* tire valve stem.

6. A control circuit for preventing inadvertent flow of a fluid from a tire repair kit, the circuit including:
a first metal contact, in a sealant hose, linked to the circuit through a first metal lead;

a second metal contact, in the sealant hose, linked to the circuit through a second metal lead; and
a switch defined by the first and second metal contacts;
wherein the first and second metal contacts are configured to close the switch when the sealant hose is attached to a tire valve;
wherein the first metal contact is configured to mate with a *threaded* tire valve stem.

9. A control circuit for preventing inadvertent flow of a fluid from a tire repair kit, the circuit including:
a first metal contact in a sealant assembly;
a second metal contact in a kit housing; [and]
*a third metal contact, in a sealant hose;*
*a fourth metal contact in the sealant hose;*
a first switch defined by the first and second metal contacts;
wherein the first and second metal contacts are configured to close the first switch when the sealant assembly is attached to the kit housing;
a second switch having a default position disconnecting [the] *an* air compressor from a power source;
wherein the second switch is configured to close, connecting the air compressor to the power source under predetermined conditions;
wherein the predetermined condition is either: (i) receiving an on-signal after power is received from the power source; or (ii) receiving a control signal from a diverter switch after power is received from the power source; *and*
*a third switch defined by the third and fourth metal contacts;*
*wherein the third and fourth metal contacts are configured to link the power source to the air compressor, when the sealant hose is attached to a tire valve; and*
*wherein the third metal contact is configured to mate with a threaded tire valve stem.*

10. A temporary mobility kit for repairing tires, comprising:
an air compressor;
a sealant assembly selectively connected to the air compressor;
a sealant hose in the sealant assembly, configured to connect the air compressor to a tire valve;
a first circuit configured to assess a connection condition; and
a second circuit, the second circuit including:
a *first* switch having a default position disconnecting the air compressor from a power source;
wherein the *first* switch is configured to close, connecting the air compressor to the power source, under a predetermined condition;
wherein the predetermined condition is either: (i) receiving an on-signal after power is received from the power source; or (ii) receiving a control signal from a diverter switch after power is received from the power source;
*wherein the first circuit is configured to selectively link the power source to the air compressor;*
*wherein the first circuit includes:*
*a first metal contact, in the sealant hose, linked to the first circuit through a first metal lead;*
*a second metal contact, in the sealant hose, linked to the first circuit through a second metal lead; and*
*a second switch defined by the first and second metal contacts;*
*wherein the first and second metal contacts are configured to close the second switch, thus linking the power source to the air compressor, when the sealant hose is attached to a tire valve; and*
*wherein the first metal contact is configured to mate with a threaded tire valve stem.*

11. The control circuit of claim 9, wherein the fourth metal contact is configured to mate with a tire valve core.

12. The kit of claim 10, wherein the connection condition is sealant assembly attachment to a kit housing.

13. The kit of claim 10, wherein the connection condition is sealant hose attachment to a tire valve.

14. The kit of claim 10, wherein the second metal contact is configured to mate with a tire valve core.

15. The kit of claim 10, wherein the first circuit includes:
a third switch having a third metal contact in the sealant assembly and a fourth metal contact in a kit housing;
wherein the third switch is configured to close when the sealant assembly is attached to the kit housing.

* * * * *